US008634759B2

(12) United States Patent
Bates et al.

(10) Patent No.: US 8,634,759 B2
(45) Date of Patent: Jan. 21, 2014

(54) TIMING OFFSET TOLERANT KARAOKE GAME

(75) Inventors: Richard Eliot Bates, London (GB); Paulina Bozek, London (GB)

(73) Assignee: Sony Computer Entertainment Europe Limited (GB)

( * ) Notice: Subject to any disclaimer, the term of this patent is extended or adjusted under 35 U.S.C. 154(b) by 766 days.

(21) Appl. No.: 10/564,103

(22) PCT Filed: Jul. 9, 2004

(86) PCT No.: PCT/GB2004/002991
§ 371 (c)(1),
(2), (4) Date: Mar. 30, 2007

(87) PCT Pub. No.: WO2005/005006
PCT Pub. Date: Jan. 20, 2005

(65) Prior Publication Data
US 2007/0178971 A1    Aug. 2, 2007

(30) Foreign Application Priority Data

Jul. 9, 2003    (GB) .................................. 0316111.4

(51) Int. Cl.
| G09B 5/00 | (2006.01) |
| A63H 5/00 | (2006.01) |
| G10H 1/36 | (2006.01) |
| G10H 1/40 | (2006.01) |
| G10H 1/26 | (2006.01) |
| G10H 5/00 | (2006.01) |

(52) U.S. Cl.
USPC .............. 434/307 A; 84/609; 84/610; 84/616; 84/649; 84/654; 84/611

(58) Field of Classification Search
USPC ........ 434/307 A; 84/609, 610, 616, 649, 654, 84/611
See application file for complete search history.

(56) References Cited

U.S. PATENT DOCUMENTS

| 4,694,723 A | * | 9/1987 | Shinohara et al. ............... 84/609 |
| 5,395,123 A | | 3/1995 | Kondo |

(Continued)

FOREIGN PATENT DOCUMENTS

| EP | 1 029 565 | 10/2000 |
| EP | 1 079 368 | 2/2001 |

(Continued)

OTHER PUBLICATIONS

International Search Report dated Oct. 19, 2004, for corresponding International Application No. PCT/GB2004/002991.

(Continued)

*Primary Examiner* — Xuan Thai
*Assistant Examiner* — Michael Grant
(74) *Attorney, Agent, or Firm* — Lerner, David, Littenberg, Krumholz & Mentlik, LLP

(57) ABSTRACT

Game processing apparatus comprises means for indicating successive target actions to be executed by a user, each target action having an associated target time of execution; and scoring logic in which detected user actions are compared with the target actions, the storing logic comprising: an input arrangement by which user actions may be detected; means for comparing a detected sequence of user actions with a sequence of target actions; and means for detecting a timing offset between the sequence of user actions and a corresponding sequence of target actions; in which the comparison of subsequent user actions with respective target actions is arranged to apply the timing offset as a relative displacement between the detected user actions and the target times.

19 Claims, 7 Drawing Sheets

(56) References Cited

U.S. PATENT DOCUMENTS

Figure 1:
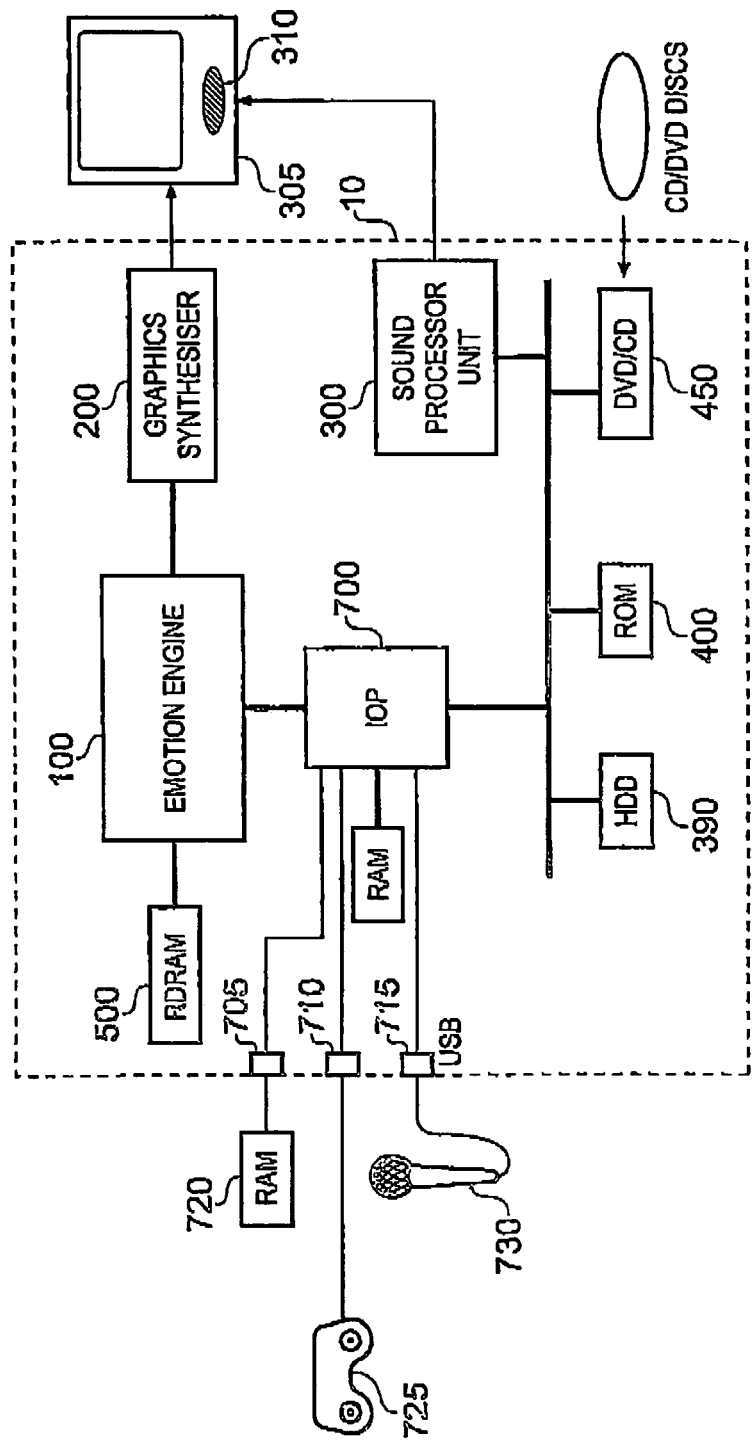

| | | | |
|---|---|---|---|
| 5,434,949 A * | 7/1995 | Jeong | 704/270 |
| 5,511,053 A * | 4/1996 | Jae-Chang | 369/53.34 |
| 5,565,639 A * | 10/1996 | Bae | 84/477 R |
| 5,567,162 A * | 10/1996 | Park | 434/307 A |
| 5,782,692 A | 7/1998 | Stelovsky | |
| 5,804,752 A * | 9/1998 | Sone et al. | 84/610 |
| 5,889,224 A * | 3/1999 | Tanaka | 84/645 |
| 6,225,547 B1 * | 5/2001 | Toyama et al. | 84/611 |
| 7,379,869 B2 * | 5/2008 | Kendra | 704/246 |
| 7,485,042 B2 * | 2/2009 | Nakatsuka et al. | 463/42 |

FOREIGN PATENT DOCUMENTS

| | | |
|---|---|---|
| EP | 1 033 157 | 11/2001 |
| EP | 1 201 277 | 5/2002 |
| EP | 1 174 856 | 12/2002 |
| JP | 60-260082 | 12/1985 |
| JP | 3-28878 | 2/1991 |
| JP | 4-13189 | 1/1992 |
| JP | 11-249675 | 9/1999 |
| JP | 2000-56778 | 2/2000 |
| JP | 2000-181466 | 6/2000 |
| JP | 2000-288254 | 10/2000 |
| JP | 2001-232062 | 8/2001 |
| WO | WO 02/093864 | 11/2002 |

OTHER PUBLICATIONS

Written Opinion of the International Searching Authority dated Oct. 19, 2004, for corresponding International Application No. PCT/GB2004/002991.

United Kingdom Search Report dated Dec. 22, 2003, for corresponding United Kingdom Application No. GB 0316111.4.

Joshua A. Bloch et al. Real-Time Computer Accompaniment of Keyboard Performances, ICMC, International Computer Music Conference, pp. 279-289, 1985.

Examination Report under Section 18(3) dated Apr. 13, 2006, for corresponding Great Britain Application No. 0316111.4.

Office Action from corresponding Japanese Application No. 2006-518371 dated Jul. 23, 2010.

Notification of Reasons for Refusal dated Jan. 26, 2010, from the corresponding Japanese Application.

Notification of Reasons for Refusal dated Aug. 4, 2009, from the corresponding Japanese Application.

* cited by examiner

```
<MELODY Tempo="96" Resolution="Semiquaver" >

<SONG_ELEMENT Type="Sentence Marker"> </SONG_ELEMENT>
<SONG_ELEMENT Type="Note" MidiNote="0" Duration="83" Lyric="" > </SONG_ELEMENT>
<SONG_ELEMENT Type="Note" MidiNote="45" Duration="2" Lyric="Ques-"> </SONG_ELEMENT>
<SONG_ELEMENT Type="Note" MidiNote="47" Duration="1" Lyric="tion:"> </SONG_ELEMENT>
<SONG_ELEMENT Type="Sentence Marker"> </SONG_ELEMENT>
<SONG_ELEMENT Type="Note" MidiNote="0" Duration="1" Lyric=""> </SONG_ELEMENT>
<SONG_ELEMENT Type="Note" MidiNote="53" Duration="1" Lyric="Tell"> </SONG_ELEMENT>
<SONG_ELEMENT Type="Note" MidiNote="49" Duration="1" Lyric="me"> </SONG_ELEMENT>
<SONG_ELEMENT Type="Note" MidiNote="45" Duration="1" Lyric="what"> </SONG_ELEMENT>
<SONG_ELEMENT Type="Note" MidiNote="49" Duration="1" Lyric="you"> </SONG_ELEMENT>
<SONG_ELEMENT Type="Note" MidiNote="49" Duration="1" Lyric="think"> </SONG_ELEMENT>
<SONG_ELEMENT Type="Note" MidiNote="47" Duration="1" Lyric="a-"> </SONG_ELEMENT>
<SONG_ELEMENT Type="Note" MidiNote="45" Duration="2" Lyric="bout"> </SONG_ELEMENT>
<SONG_ELEMENT Type="Note" MidiNote="49" Duration="2" Lyric="me"> </SONG_ELEMENT>

</MELODY>
```

Fig. 5

TIMING OFFSET TOLERANT KARAOKE GAME

This application is the National Stage of International Application No. PCT/GB2004/002991, filed Jul. 9, 2004, which claims the benefit under 35 U.S.C. 119 (a-e) of GB 0316111.4 filed Jul. 9, 2003, which is herein incorporated by reference.

This invention relates to electronic game processing. A particular example involves the control of video game processing operations, but the invention has more general application to other types of electronic game processing.

In a conventional video games machine, a user views the game on a video monitor or television screen, and controls operation of the game using a hand-held keypad or joystick. With some games machines such as the Sony® PlayStation® 2, a handheld controller provides two joysticks and several user-operated keys, along with a vibrating element to provide tactile feedback to the user of events occurring within the game.

Some games require the user to carry out certain actions in response to an indication (e.g. on a display) of a target action. The user is judged on the accuracy of his response to the target actions. For example, the system might test whether the user carried out the correct action, or whether the user carried out the action at the correct time. An example of such a game is a so-called karaoke game, in which the user is presented with a series of words to be sung to form a song. A backing track for the song is played on a loudspeaker, and the user sings along into a microphone. The user may be judged on (for example) the pitch and timing of his singing.

This invention provides game processing apparatus comprising:

means for indicating successive target actions to be executed by a user, each target action having an associated target time of execution; and scoring logic in which detected user actions are compared with the target actions, the scoring logic comprising:

an input arrangement by which user actions may be detected;

means for comparing a detected sequence of user actions with a sequence of target actions; and means for detecting a timing offset between the sequence of user actions and a corresponding sequence of target actions;

in which the comparison of subsequent user actions with respective target actions is arranged to apply the timing offset as a relative displacement seen the detected user actions and the target times.

The invention recognises a potential problem in this type of target action-user action game, which is the user may complete a sequence of actions correctly, with a correct or good relative timing between the actions, but the whole sequence may be offset in time relative to the target times. Normally, such a sequence would score poorly in an electronic game, because each individual user action would miss its respective target time the timing offset could be caused by the user's reaction time or, in the case of a so called "karaoke" game, by the user's poor sense of musical timing.

The invention assesses from a sequence of target actions and user actions, such as an initial sequence, whether such a timing offset exists. The timing offset is then applied as a timing correction to subsequent user actions, in an attempt to avoid penalising users suffering from this timing problem.

The invention is particularly (though not exclusively) applicable to singing or karaoke type games, in which the target actions indicate a required musical note; the user actions involve the user singing a musical note; and the input arrangement comprises a microphone. In such a game, it is preferred that the scoring logic is operable to detect that a user has successfully carried out a target action if a musical note generated by the user is within a tolerance amount (e.g. pitch amount) of the corresponding target musical note.

Preferably, where the target actions indicate a required word to be sung and the user actions involve singing the required word, the scoring logic is operable to vary the tolerance amount in dependence on the required word. Preferably the scoring logic is operable to not attempt scoring in respect of a predefined set of words or syllables. Examples of such words are those including the English "ss" or "the" sounds, for which it is relatively difficult to assess the pitch of the user's voice accurately.

To avoid penalising users with different vocal registers, it is preferred that the scoring logic is arranged to detect a difference in tone between a target musical note and the octave-multiple of a user-generated musical note which is closest in tone to the target musical note.

Preferably the target actions are arranged as successive groups of target actions, the groups being separated by pauses in which no user action is expect. This is useful to give the user a break in many types of game, but in the case of a karaoke type of game it corresponds to the normal flow of a song as a series of lines.

Because the user's timing may alter at such a break, it is preferred that the scoring logic is arranged to detect the timing offset after each pause.

Preferably the scoring logic is arranged to detect the correlation between the sequence of user actions and the sequence of target actions at two or more possible values of the timing offset, and to set the timing offset to be that one of the possible values for which the detected correlation is greatest.

As examples, the target times of execution could define start times in respect of the associated target actions and/or could define durations in respect of the associated target actions.

The invention also provides a method of game processing in which user actions are compared with target actions, the method comprising:

indicating successive target actions to be executed by a user, each target action having an associated target time of execution;

detecting user actions;

comparing a detected sequence of user actions with a sequence of target actions;

detecting a timing offset between the sequence of user actions and a corresponding sequence of target actions;

in which the comparison of subsequent user actions with respective target actions is arranged to apply the timing offset as a relative displacement between the detected user actions and the target times.

This invention also provides computer software having program code for carrying out a method as above. The computer software is preferably provided by a providing medium so as a transmission medium or a storage medium.

Further respective aspects and features of the invention are defined in the appended claims.

Figure 2:
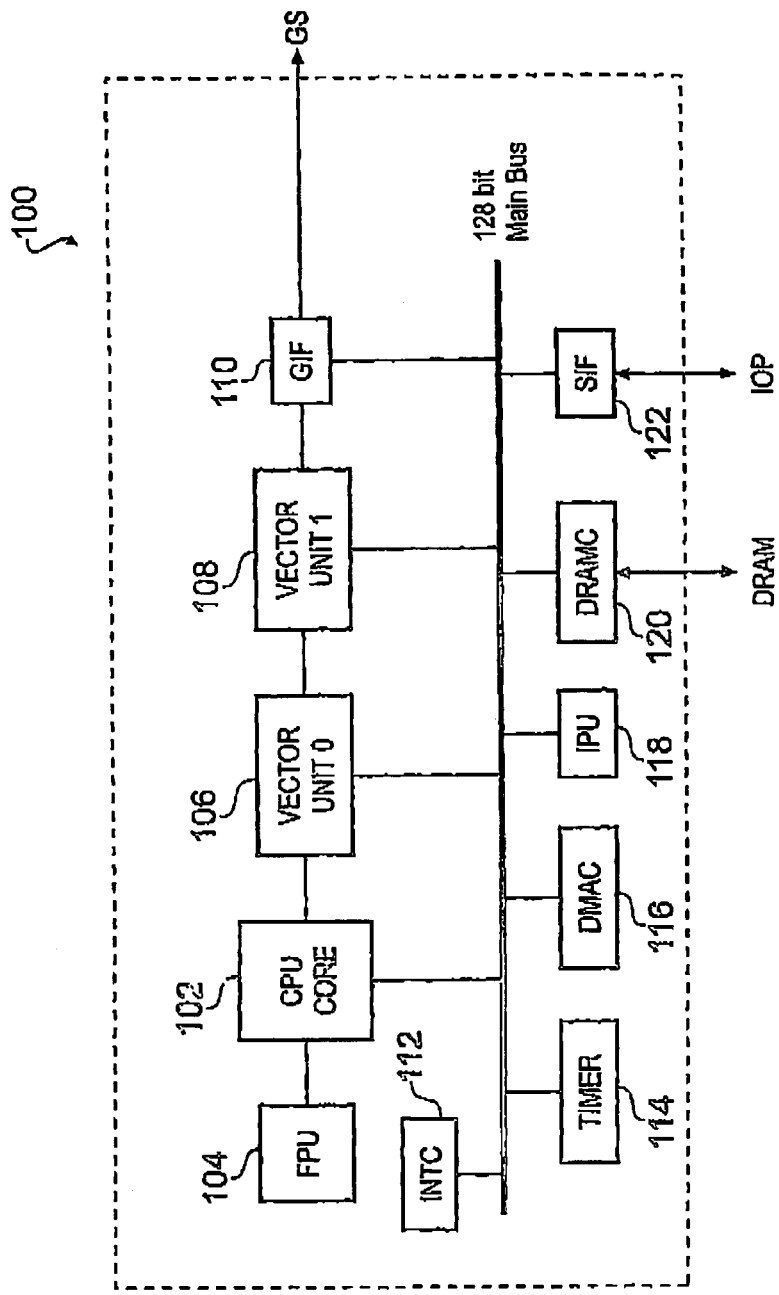
Figure 3:
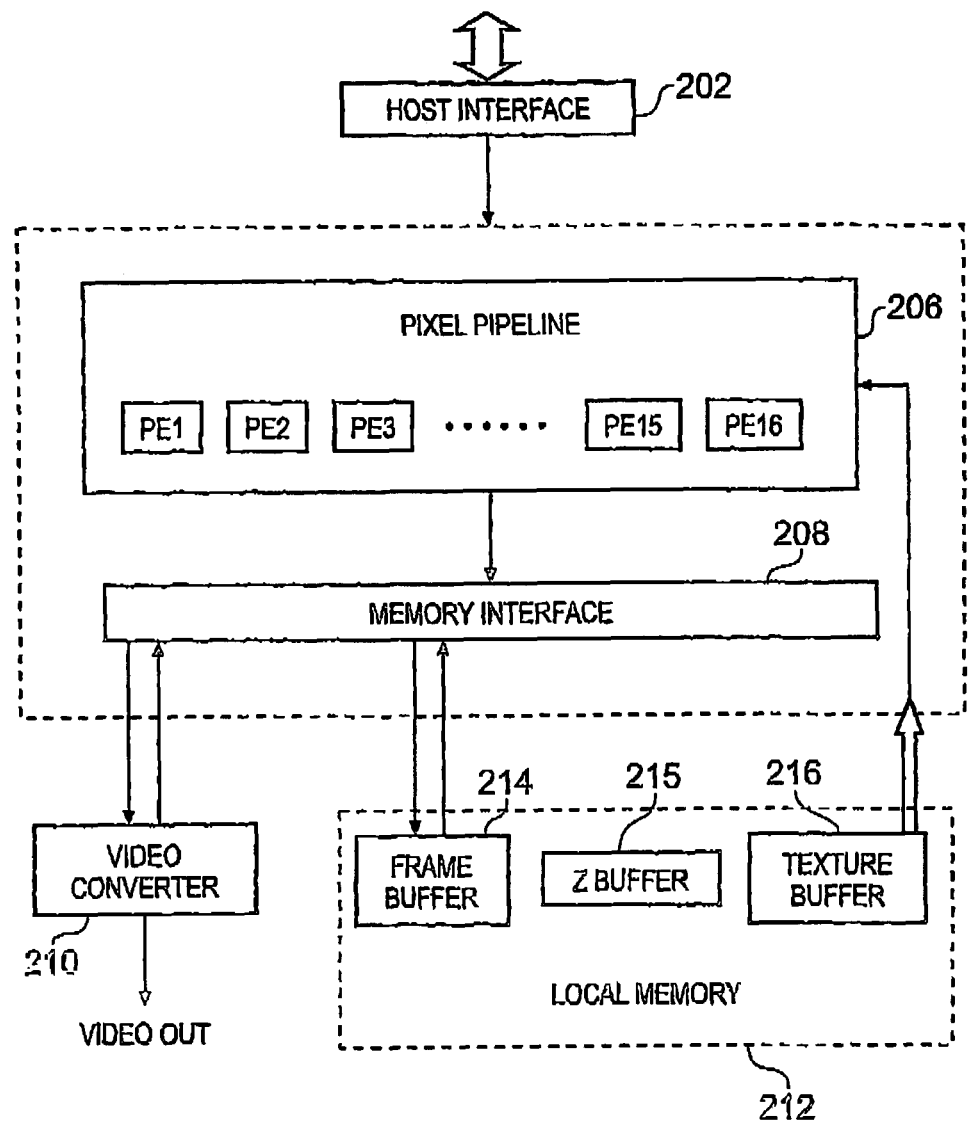
Figure 4:
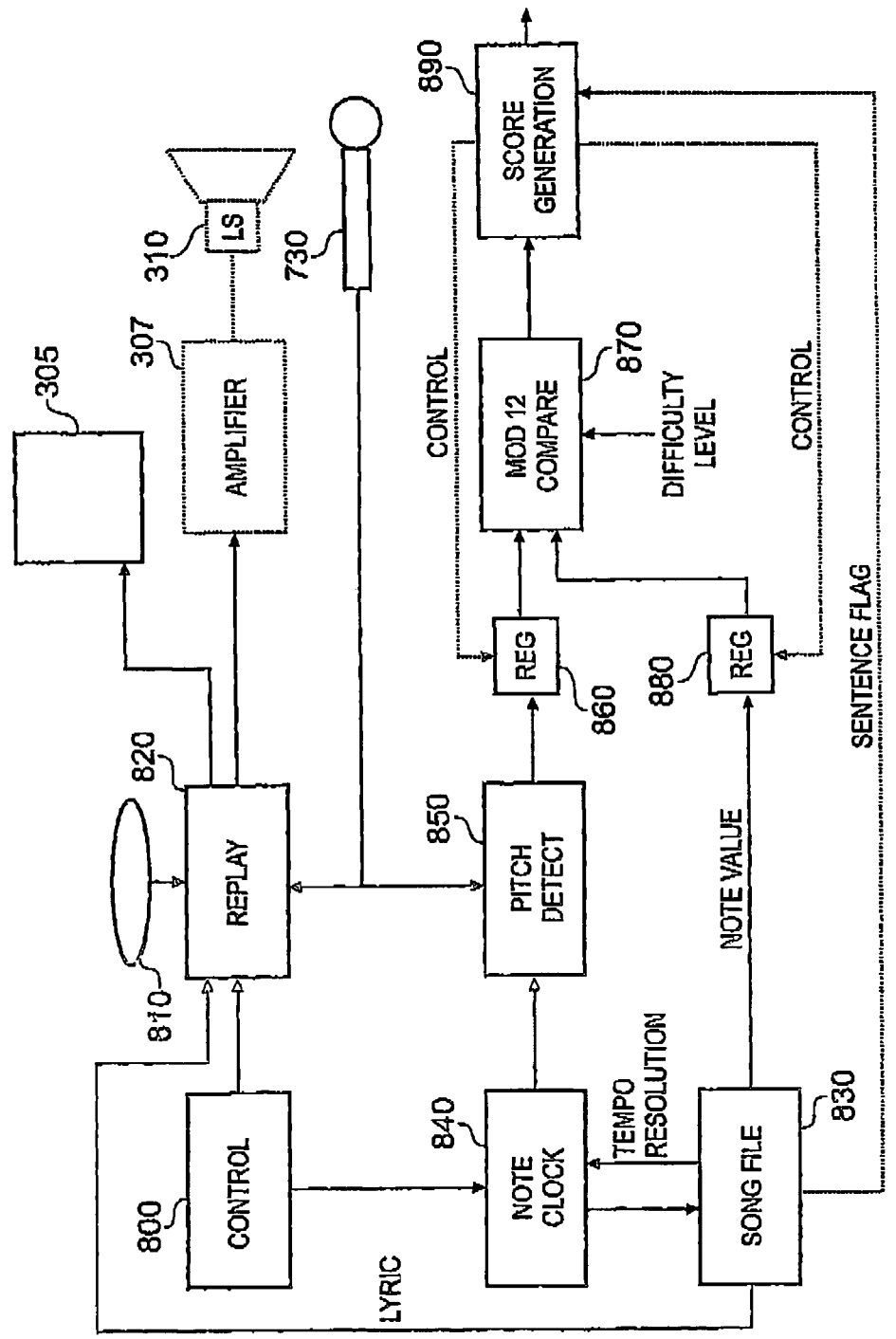
Figure 6:
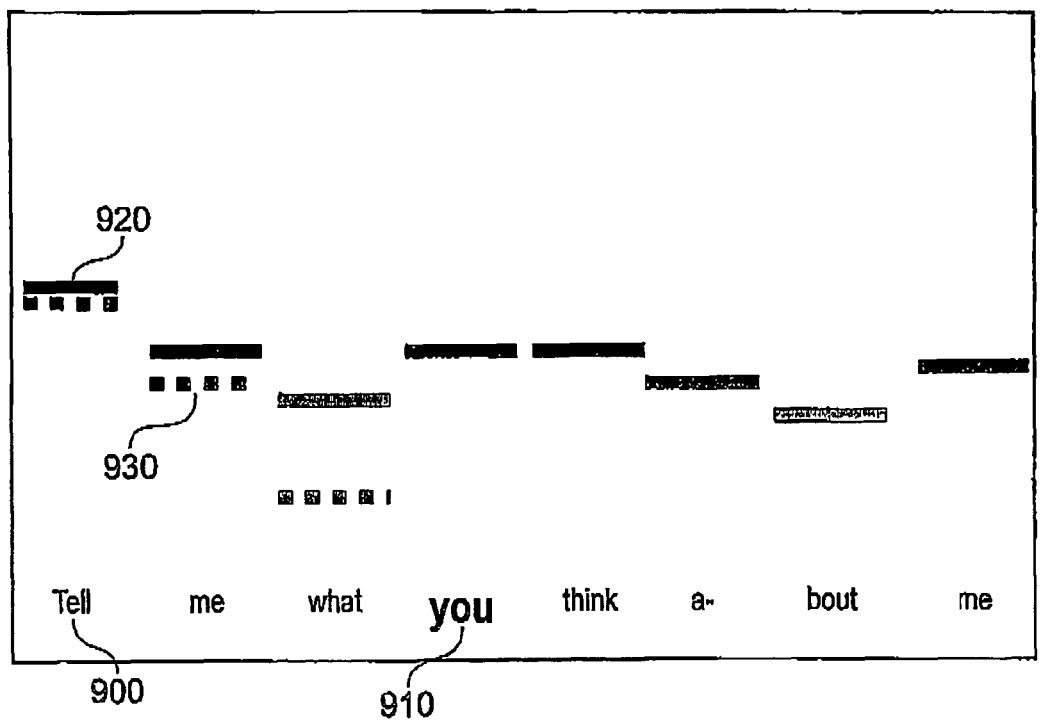
Figure 7:
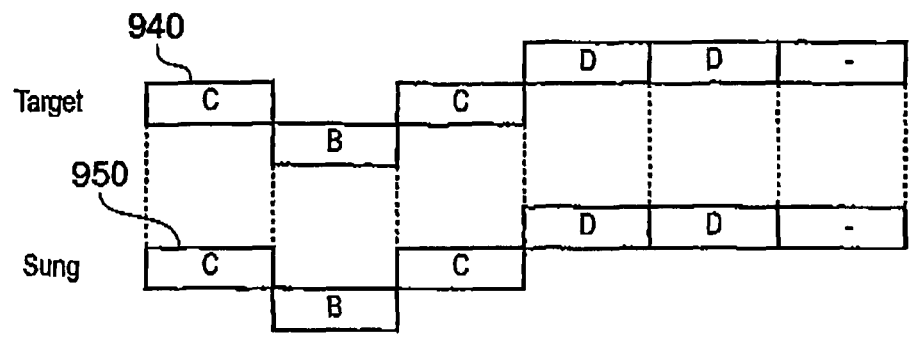
Figure 8:
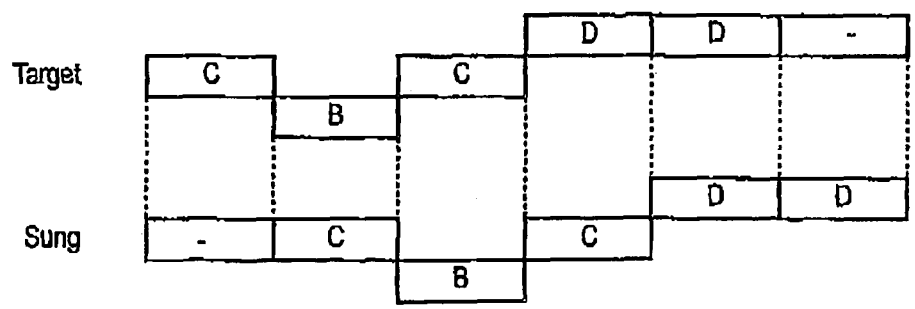

Embodiments of the invention will now be described, by way of example only, with reference to the accompanying drawings in which:

FIG. 1 schematically illustrates the overall system architecture of the PlayStation2;

FIG. 2 schematically illustrates the architecture of an Emotion Engine;

FIG. 3 schematically illustrates the configuration of a Graphic synthesiser;

FIG. 4 is a schematic diagram illustrating the logical functionality of the PlayStation2 in respect of an embodiment of the invention;

FIG. 5 schematically illustrates a part of a song file;

FIG. 6 schematically illustrates a screen display;

FIG. 7 schematically ills a song as sung by a singer with good timing;

FIG. 8 schematically illustrates a poorly timed song; and

Figure 9:
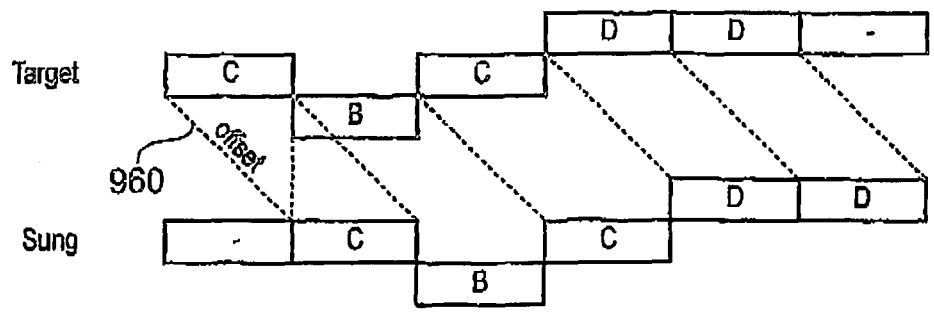

FIG. 9 schematically illustrates a song with a corrective timing offset applied.

FIG. 1 schematically illustrates the overall system architecture of the PlayStation2. A system unit 10 is provided, with various peripheral devices connectable to the system unit.

The system unit 10 comprises: an Emotion Engine 100; a Graphics Synthesiser 200; a sound processor unit 300 having disc random access memory (DRAM); a read only memory (ROM) 400; a compact disc (CD) and digital versatile disc (DVD) reader 450; a Rambus Dynamic Random Access Memory (RDRAM) unit 500; an input/output processor (IOP) 700 with dedicated RAM 750. An (optional) external hard disk drive (HDD) 390 may be connected.

The input/output processor 700 has two Universal Serial Bus (USB) ports 715 and an iLink or IEEE 1394 port (iLink is the Sony Corporation implementation of IEEE 1394 standard). The IOP 700 handles au USB, iLink and game controller data traffic. For example when a user is playing a game, the IOP 700 receives data from the game controller and directs it to the Emotion Engine 100 which updates the current state of the game accordingly. The IOP 700 has a Direct Memory Access (DMA) architecture to facilitate rapid data transfer rates. DMA involves transfer of data from main memory to a device without passing it through the CPU. The USB interface is compatible with Open Host Controller Interface (OHCI) and can handle data transfer rates of between 1.5 Mbps and 12 Mbps. Provision of these interfaces mean that the PlayStation2 is potentially compatible with peripheral devices such as video cassette recorders (VCRs), digital cameras, microphones, set-top boxes, printers, keyboard, mouse and joystick.

Generally, in order for successful data communication to occur with a peripheral device connected to a USB port 715, an appropriate piece of software such as a device driver should be provided. Device driver technology is very well known and will not be described in detail here, except to say that the skilled man will be aware that a device driver or similar software interface may be required in the embodiment described here.

In the present embodiment, a USB microphone 730 is connected to the USB port. The microphone includes an analogue-to-digital converter (ADC) and a basic hardware-based based real-time data compression and encoding arrangement, so that audio data are transmitted by the microphone 730 to the USB port 715 in an appropriate format such as 16-bit mono PCM (an uncompressed format) for decoding at the PlayStation 2 system unit 10.

Apart from the USB ports, two other ports 705, 710 are proprietary sockets allowing the connection of a proprietary non-volatile RAM memory card 720 for storing game-related information, a hand-held game controller 725 or a device (not shown) mimicking a hand-held controller, such as a dance mat.

The Emotion Engine 100 is a 128-bit Central Processing Unit (CPU) that has been specifically designed for efficient simulation of 3 dimensional (3D) graphics for games applications. The Emotion Engine components include a data bus, cache memory and registers, all of which are 128-bit. This facilitates fast processing of large volumes of multi-media data Conventional PCs, by way of comparison, have a basic 64-bit data structure. The floating point calculation performance of the PlayStation2 is 6.2 GFLOPs. The Emotion Engine also comprises MPEG2 decoder circuitry which allows for simultaneous processing of 3D graphics data and DVD data. The Emotion Engine performs geometrical calculations including mathematical transforms and translations and also performs calculations associated with the physics of simulation objects, for example, calculation of friction between two objects. It produces sequences of image rendering commands which are subsequently utilised by the Graphics Sythesiser 200. The image rendering commands are output in the form of display lists. A display list is a sequence of drawing commands that specifies to the Graphics Synthesiser which primitive graphic objects (e.g. points, lines, triangles, sprites) to draw on the screen and at which co-ordinates. Thus a typical display list will comprise commands to draw vertices, commands to shade the faces of polygons, render bitmaps and so on. The Emotion Engine 100 can asynchronously generate multiple display lists.

The Graphics Synthesiser 200 is a video accelerator that performs rendering of the display lists produced by the Emotion Engine 100. The Graphics Synthesiser 200 includes a graphics interface unit (GIF) which handles, tracks and manages the multiple display lists. The rendering function of the Graphics Synthesiser 200 can generate image data that supports several alternative standard output image formats, i.e., NTSC/PAL, High Definition Digital TV and VESA. In general, the rendering capability of graphics systems is defined by the memory bandwidth between a pixel engine and a video memory, each of which is located within the graphics processor. Conventional graphics systems use external Video Random Access Memory (VRAM) connected to the pixel logic via an off-chip bus which tends to restrict available bandwidth. However, the Graphics Synthesiser 200 of the PlayStation2 provides the pixel logic and the video memory on a single high-performance chip which allows for a comparatively large 38.4 Gigabyte per second memory access bandwidth. The Graphics Synthesiser is theoretically capable of achieving a peak drawing capacity of 75 million polygons per second. Even with a full range of effects such as textures, lighting and transparency, a sustained rate of 20 million polygons per second can be drawn continuously. Accordingly, the Graphics Synthesiser 200 is capable of rendering a film-quality image.

The Sound Processor Unit (SPU) 300 is effectively the soundcard of the system which is capable of recognising 3D digital sound such as Digital Theater Surround (DTS®) sound and AC-3 (also known as Dolby Digital) which is the sound format used for digital versatile disks (DVDs).

A display and sound output device 305, such as a video monitor or television set with an associated loudspeaker arrangement 310, is connected to receive video and audio signals from the graphics synthesiser 200 and the sound processing unit 300.

The main memory supporting the Emotion Engine 100 is the RDRAM (Rambus Dynamic Random Access Memory) module 500 produced by Rambus Incorporated. This RDRAM memory subsystem comprises RAM a RAM controller and a bus connecting the RAM to the Emotion Engine 100.

FIG. 2 schematically illustrates the architecture of the Emotion Engine 100 of FIG. 1. The Emotion Engine 100 comprises: a floating point unit (FPU) 104; a central processing unit (CPU) core 102, vector unit zero (VU0) 106; vector unit one (VU1) 108; a graphics interface unit (GIF) 110; an interrupt controller (INTC) 112; a timer unit 114; a direct memory access controller 116; an image data processor unit (IPU) 116; a dynamic random access memory controller (DRAMC) 120; a sub-bus interface (SIF) 122; and all of these components are connected via a 128-bit main bus 124.

The CPU core 102 is a 128-bit processor clocked at 300 MHz. The CPU core has access to 32 MB of main memory via the DRAMC 120. The CPU core 102 instruction set is based on MIPS III RISC with some MIPS IV RISC instructions together with additional multimedia instruction. MIPS III and IV are Reduced Instruction Set Computer (RISC) induction set architectures proprietary to MIPS Technologies, Inc. Standard instructions are 64-bit, two-way superscalar, which means that two instructions can be executed simultaneously. Multimedia instructions, on the other hand, use 128-bit instructions via two pipelines. The CPU core 102 comprises a 16 KB instruction cache, an 8 KB data cache and a 16 KB scratchpad RAM which is a portion of cache reserved for direct private usage by the CPU.

The FPU 104 serves as a first co-processor for the CPU core 102. The vector unit 106 acts as a second co-processor. The FPU 104 comprises a floating point product sum arithmetic logic unit (FMAC) and a floating point division calculator (FDIV). Both the FMAC and FDIV operate on 32-bit values so when an operation is carried out on a 128-bit value (composed of four 32-bit values) an operation can be carried out on all four parts concurrently. For example adding 2 vectors together can be done at the same time.

The vector units 106 and 108 perform mathematical operations and are essentially specialised FPUs that are extremely fast at evaluating the multiplication and addition of vector equations. They use Floating-Point Multiply-Adder Calculators (FMACs) for addition and multiplication operations and Floating-Point Dividers (FDIVs) for division and square root operations. They have built-in memory for storing microprogram and interface with the rest of the system via Vector Interface Units (VIFs). Vector Unit Zero 106 can work as a coprocessor to the CPU core 102 via a dedicated 128-bit bus 124 so it is essentially a second specialised FPU. Vector Unit One 108, on the other hand, has a dedicated bus to the Graphics synthesiser 200 and thus can be considered as a completely separate processor. The inclusion of two vector units allows the software developer to split up the work between different parts of the CPU and the vector units can be used in either serial or parallel connection.

Vector unit zero 106 comprises 4 FMACS and 1 FDIV. It is connected to the CPU core 102 via a coprocessor connection. It has 4 Kb of vector unit memory for data and 4 Kb of micro-memory for instructions. Vector unit zero 106 is useful for performing physics calculations associated with the images for display. It primarily executes non-patterned geometric processing together with the CPU core 102.

Vector unit one 108 comprises 5 PMACS and 2 FDIVs. It has no direct path to the CPU core 102, although it does have a direct path to the GIF unit 110. It has 16 Kb of vector unit memory for data and 16 Kb of micro-memory for instructions. Vector unit one 108 is useful for perform transformations. It primarily executes patterned geometric progressing and directly outputs a generated display list to the GIF 110.

The GIF 110 is an interface unit to the Graphics Synthesiser 200. It converts data according to a tag specification at the beginning of a display list packet and transfers drawing commands to the Graphics Synthesiser 200 whilst mutually arbitrating multiple transfer. The interrupt controller (INTC) 112 serves to arbitrate interrupts from peripheral devices, except the DMAC 116.

The timer unit 114 comprises four independent timers with 16-bit counters. The timers are driven either by the bus clock (at $1/16$ or $1/256$ intervals) or via an external clock The DMAC 116 handles data transfers between main memory and peripheral processors or main memory and the scratch pad memory. It arbitrates the main bus 124 at the same time. Performance optimisation of the DMAC 116 is a key way by which to improve Emotion Engine performance. The image processing unit (IPU) 118 is an image data processor that is used to expand compressed animations and texture images. It perform I-PICTURE Macro-Block decoding, colour space conversion and vector quantisation. Finally, the sub-bus interface (SIF) 122 is an interface unit to the IOP 700. It has its own memory and bus to control I/O devices such as sound chips and storage devices.

FIG. 3 schematically illustrates the configuration of the Graphic Synthesiser 200. The Graphics Synthesiser comprises: a host interface 202; a set-up/rasterizing unit 204; a pixel pipeline 206; a memory interface 208; a local memory 212 including a frame page buffer 214 and a texture page buffer 216; and a video converter 210.

The host interface 202 transfers data with the host (in this case the CPU core 102 of the Emotion Engine 100). Both drawing data and buffer data from the host pass through this interface. The output from the host interface 202 is supplied to the graphics synthesiser 200 which develops the graphics to draw pixels based on vertex information received from the Emotion Engine 100, and calculates information such as RGBA value, depth value (i.e. Z-value), texture value and fog value for each pixel. The RGBA value specifies the red, green, blue (RGB) colour components and the A (Alpha) component represents opacity of an image object. The Alpha value can range from completely transparent to totally opaque. The pixel data is supplied to the pixel pipeline 206 which performs processes such as texture mapping, fogging and Alpha-blending and determines the final drawing colour based on the calculated pixel information.

The pixel pipeline 206 comprises 16 pixel engines PE1, PE2 . . . PE16 so that it can process a maximum of 16 pixels concurrently. The pixel pipeline 206 runs at 150 MHz with 32-bit colour and a 32-bit Z-buffer. The memory interface 208 reads data from and writes data to the local Graphics Synthesiser memory 212. It writes the draw pixel values (RGBA and Z) to memory at the end of a pixel operation and reads the pixel values of the frame buffer 214 from memory. These pixel values read from the frame buffer 214 are used for pixel test or Alpha-blending. The memory interface 208 also reads from local memory 212 the RGBA values for the current contents of the frame buffer. The local memory 212 is a 32 Mbit (4 MB) memory that is built-in to the Graphics Synthesiser 200. It can be organised as a frame buffer 214, texture buffer 216 and a 32-bit Z-buffer 215. The Same buffer 214 is the portion of video memory where pixel data such as colour information is stored.

The Graphics Synthesiser uses a 2D to 3D texture mapping process to add visual detail to 3D geometry. Each texture may be wrapped around a 3D image object and is stretched and skewed to give a 3D graphical effect. The texture buffer is used to store the texture information for image objects. The Z-buffer 215 (also known as depth buffer) is the memory available to store the depth information for a pixel. Images are constructed from basic building blocks known as graphics primitives or polygons. When a polygon is rendered with Z-buffer, the depth value of each of its pixels is compared with the corresponding value stored in the Z-buffer. If the value stored in the Z-buffer is greater than or equal to the depth of the new pixel value then this pixel is determined visible so that it should be rendered and the Z-buffer will be updated with the new pixel depth. If however the Z-buffer depth value is less than the new pixel depth value the new pixel value is behind what has already been drawn and will not be rendered.

The local memory 212 has a 1024-bit read port and a 1024-bit write port for accessing the frame buffer and Z-buffer and a 512-bit port for texture reading. The video converter 210 is operable to display the contents of the frame memory in a specified output format.

FIG. 4 is a schematic diagram illustrating the logical functionality of the PlayStation2 in respect of an embodiment of the invention. The functions of blocks shown in FIG. 4 are of course carried out, mainly by execution of appropriate software by parts of the PlayStation2 as shown in FIG. 1, the particular parts of the PlayStation2 concerned being listed below. The software could be provided from disk or ROM storage, and/or via a transmission medium such as an internet connection.

To execute a karaoke game, control logic 800 initiates the replay of an audio backing track from a disk storage medium 810. The audio replay is handled by replay logic 320 and takes place through an amplifier 307 forming part of the television set 305, and the loudspeaker 310 also forming part of the television set.

The replay or generation of a video signal to accompany the audio is also handled by the replay logic 820. Background images may be stored on the disk 110 or may instead be synthesised. Graphical overlays representing the lyrics to be sung and an indication of pitch and timing are also generated in response to data form a song file 830 to be described below. The output video signal is displayed on the screen of the television set 305.

The microphone 730 is also connected to the replay logic 820. The replay logic 820 converts the digitised audio signal from the microphone back into an analogue signal and supplies it to the amplifier 307 so that the user can hear his own voice through the loudspeaker 310.

The song file will now be described.

The song file 830 stores data defining each note which the user has to sing to complete a current song. An example of a song file is shown schematically in FIG. 5. The song file is expressed in XML format and starts with a measure of the song's tempo, expressed in beats-per-minute. The next term is a measure of resolution, i.e. what fraction of a beat is used in the note duration figures appearing in that song file. In the example of FIG. 5, the resolution is "semiquaver" and the tempo is 96 beats per minute which means that a note duration value of "1" corresponds to a quarter of a beat, or in other words 1/384 of a minute.

A number of so called "song elements" follow. The first of these is a "sentence marker". Sentence markers are used to divide the song into convenient sections, which will often coincide with sentences or phrases in the lyrics. A sentence break is often (though not always) associated with a pause during which the user is not expected to sing. The pause might represent the opening bars of a song, a gap between successive lines or phrases, or the closing ban of the song. The sentence marker does not of itself define how long the pause is to be. This in fact is defined by the immediately following song element which sets a pitch or "midi-note" value of zero (i.e. no note) for a particular duration.

In the subsequent song elements, where the midi-note value is non-zero this represents a particular pitch at which the user is expected to sing. In the midi-scale, middle C is represented by numerical value 60. The note A above middle C, which has a standard frequency of 440 Hz, is represented by midi number 69. Each octave is represented by a span of 12 in the midi scale, so (for example) top C (C above middle C) is represented by midi-note value 72.

It should be noted that in some systems, the midi-note value 0 is assigned to bottom C (about 8.175 Hz), but in the present embodiment the midi-note value 0 indicates a pause with no note expected.

Each non-zero midi-note value has an associated lyric. This might be a part of a word, a whole word or even (in some circumstances) more than one word. It is possible for the word to be empty, e.g. (in XML) LYRIC=""

So, the song elements each define a pitch, a duration and a lyric.

In the present example, the song file defines the lyrics for display and the pitch and note lengths that the user is expected to sing. It does not define the backing track which the user will hear and which in fact will prompt the user to sing the song. The backing tack is recorded separately, for example as a conventional audio recording. This arrangement means that the backing track replay and the reading of data from the song file need to start at related times (e.g. substantially simultaneously), something which is handled by the control logic 800. However, in other embodiments the song file could define the backing track as well, for example as a series of midi-notes to be synthesised into sounds by a midi synthesiser (not shown in FIG. 4, but actually embodied within the SPU 300 of FIG. 1).

Returning to FIG. 4, a note clock generator 840 reads the tempo and resolution values from the song file 830 and provides a clock signal at the appropriate rate. In particular, the rate is the tempo multiplied by the sub-division of each beat. So, for example, for a tempo of 96 and a resolution of "semiquaver" (quarter-beat) the note clock runs at 96×4 beats-per-minute, i.e. 384 beats-per-minute if the tempo were 90 and the resolution were "quaver" (half-beat) then the note clock would run at 180 (90×2) beats-per-minute, and so on.

The note clock is used to initiate reading out from the song file 830 of each song element and also to control the detection of pitch of the user's voice.

With regard to pitch detection, the signal from the USB microphone 730 is also supplied to a pitch detector 850. This operates during temporal windows defined by the note clock to detect the pitch of the user's voice within those windows. In other words, the pitch of the user's voice is sampled at a sampling rate equal to the frequency of the note clock (384 times per minute in this example). The pitch detector uses known pitch detection techniques such as those described in the paper "Pitch Determination of Human Speech by the Harmonic Product Spectrum. The Harmonic Sum Spectrum, and a Maximum Likelihood Estimate", A. Michael Noll, Bell Telephone Labs—presented at the Symposium on Computer Processing in Communications, Polytechnic Institute of Brooklyn, Apr. 8-10, 1969. The detected pitch is converted to a numerical value on the midi-note scale as described above. The pitch value is supplied to a buffer register 860 and from there to a comparator 870. The corresponding midi-note value from the song file 830 is also read out, under the control of the note clock, and is supplied to another buffer register 880 before being passed to the comparator 870.

The register 880 buffers midi-note values from the song file. The register 860 stores the detected midi-note values generated in respect of each of the user's singing over a certain number of consecutive note clock periods. These data are used in a "correlation test" to be described below.

The comparator is arranged to compare the midi-note value from the song file with the midi-note value representing the detected pitch Where a song element in the note file represents a note having a duration greater than 1, the absolute difference between the detected pitch values and correct pitch values from the song file are average. The comparator operates with modulo 12 arithmetic. This means that an error of a multiple of 12 in the users pitch (i.e. an error of one or more whole octaves) will be disregarded in the assessment of how close the user has come to the correct note, and errors of greater from one octave are treated as if the detected pitch was in fact in the same octave as the correct note. This ensures that users are not penalised in respect of the register or normal range of their voice.

For sorting purposes, the comparator detects whether the user has achieved a pitch within a certain threshold amount of the required pitch. The threshold amount is expressed on the midi-note scale, so the threshold might be for example ±2.5 on the midi-note scale. (Although notes are expressed only as integers on the midi-note scale, fractional thresholds do have meaning in the present embodiment because of the averaging of the sampled values of the user's pitch over the course of the duration of a song element). The threshold may be set in response to a game difficulty level—so that the threshold is greater for an "easy" level and smaller for a "hard" level.

Optionally the comparator may exclude certain notes from being assessed, in response to the current lyric. This is because some lyrics, such as those containing "ss" or "the" sounds, make it hard to detect the pitch of the user's voice accurately. So in order to avoid penalising the user's score, comparisons will not be attempted when such a word is being sung. The presence of such a word can be detected by comparing the current lyric in the song file with a list of "difficult" words, or by detecting certain letter patterns in the current lyric, or by a flag being set in the song element.

Score generation logic 890 receives the results of the comparison by the comparator 870 and generates a user score from them.

The score generation logic also controls the output of values by the registers 860, 880 to the comparator 870 so as carry out a correlation test to detect a time offset—i.e. a delay or advance between the target time for singing a note and the actual time at which the user sings the note—and subsequently to implement that time offset during scoring of the user. For example, the time offset can be detected at the beginning of a "sentence" in the song, and that time offset used during the remaining of that sentence.

To explain how, this operation works, first consider an example set of three consecutive notes defined by the song file, being the first three notes of a "sentence" in the song. It will be seen that for this example, the total length of the three notes is six note clock periods.

| Note | Pitch | Target start time | Length (measured in note clock periods) |
|---|---|---|---|
| N1 | P1 | $t_0$ | 2 |
| N2 | P2 | $t_2$ | 1 |
| N3 | P3 | $t_3$ | 3 |

The user's pitch (i.e. the pitch of any input from the user via the microphone) is detected at each note clock period and is buffered in the register 860. The comparator 870 then carries out a set of comparisons, in series, in parallel or in another arrangement, so as to compare the user's contribution with the required notes at ±3 note clock periods away from the target start time of the sequence. This means that only the first two notes, N1 and N2, are considered in the process to set the timing offset because their total length adds up to three clock periods. So, if the user were to sing in perfect time, the expected comparison of pitch would be as follows:

| | | |
|---|---|---|
| detected pitch at time $t_{-3}$ | | |
| detected pitch at time $t_{-2}$ | | |
| detected pitch at time $t_{-1}$ | | |
| detected pitch at time $t_0$ | ==> | compare with P1 |
| detected pitch at time $t_1$ | ==> | compare with P1 |
| detected pitch at time $t_2$ | ==> | compare with P2 |
| detected pitch at time $t_3$ | | |
| detected pitch at time $t_4$ | | |
| detected pitch at time $t_5$ | | |
| detected pitch at time $t_6$ | | |

However, the present embodiment recognises that the user may not necessarily sing in perfect time, but could start singing early or late. The comparator 870 therefore carries out a series of comparisons over a range of delay/advance periods of ±3 note clock periods. At one extreme, i.e. to test whether the user has started singing three note clock periods too early, such a comparison might look like:

| | | |
|---|---|---|
| detected pitch at time $t_{-6}$ | | |
| detected pitch at time $t_{-5}$ | | |
| detected pitch at time $t_{-4}$ | | |
| detected pitch at time $t_{-3}$ | ==> | compare with P1 |
| detected pitch at time $t_{-2}$ | ==> | compare with P1 |
| detected pitch at time $t_{-1}$ | ==> | compare with P2 |
| detected pitch at time $t_0$ | | |
| detected pitch at time $t_1$ | | |
| detected pitch at time $t_2$ | | |
| detected pitch at time $t_3$ | | |
| detected pitch at time $t_4$ | | |
| detected pitch at time $t_5$ | | |
| detected pitch at time $t_6$ | | |

At the other extreme, i.e. to test whether the user has started singing three notes too late, the comparison might look like:

| | | |
|---|---|---|
| detected pitch at time $t_{-2}$ | | |
| detected pitch at time $t_{-1}$ | | |
| detected pitch at time $t_0$ | | |
| detected pitch at time $t_1$ | | |
| detected pitch at time $t_2$ | | |
| detected pitch at time $t_3$ | ==> | compare with P1 |
| detected pitch at time $t_4$ | ==> | compare with P1 |
| detected pitch at time $t_5$ | ==> | compare with P2 |
| detected pitch at time $t_6$ | | |
| detected pitch at time $t_7$ | | |

A threshold amount similar to that described above is used during the correlation test to detect the time offset. The correlation test searches for the sung notes which are closest to the pitch of the required notes and their associated timing, but they are disregarded for these purposes if they differ from the required notes by more than a threshold amount of 2 semitones (2 MIDI note values). (A variable threshold is also used, as described above, in a subsequent analysis of how well the user sang, taking the time offset into account, in order to score that user.)

So, in the present example, a total of 7 such comparisons are carried out. Each comparison will provide three results, i.e. the pitch errors in respect of the three note clock periods in the test group. In one embodiment these three results are combined (e.g. added) to give a single output value in respect of each possible delay/advance period. In another embodiment the pitch of only the first note clock period is considered.

Among the set of outputs from the correlation test there will normally be a single correlation "peak", that is to say a value of the delay/advance which gives the greatest correlation between the user's pitch for the tree note clock periods (or the first note clock period) and the target pitch. The skilled person will understand that depending on the way in which the output values are represented, this could be the highest output value or the lowest output value.

Assuming such a single peak exists, then that value is carried forward for use as a time offset over the remainder of that sentence. For example, if it is found that the peak occurs when the offset is—3 note clock periods (i.e. the user started singing 3 note clock periods too early), then for the remainder of that sentence all further comparisons are between the target pitch and the pitch that the user sang three clock periods earlier. The offset is reset at the next sentence marker in the song file, and the correlation test described above is repeated.

The detection of correlation can be applied to the three clock periods, as described above, or can be applied just to a search for the closest match to the first note in the target sequence.

If the player's singing is early, then the closest match between the sung notes and the required notes is chosen. If the closest match is not close enough, i.e. it is more than the threshold amount of 2 semitones different, the offset is set to 0 and not timing correction is made. If more than one note matches equally well, the oldest sung notes having a patch matching the first note of the target sequence may be used to decide the offset. If the singing is late, we simply find the closest note. If two notes match, or if there are two correlation "peaks", then a convention is established to choose the earliest note or peak (i.e. the longest ago in time).

A generalization of this is that if there is no peak at all (which could happen if the user was not singing at all) then an offset of zero is used for that sentence.

At the start of a new sentence, the comparator can detect the pitches of the first three note clock periods of that sentence, excluding a first note (if present) for which the midi-note value is zero. If there are fewer than three note clock periods in the sentence, then the total of all of the notes is detected. This then determines the number of comparisons which have to be made for the correlation test and also the time at which the last of those comparisons can be completed. Alternatively, particularly if the comparisons were executed in hardware, it may be convenient to carry out a fixed number of comparisons but to use only a certain number of them used in the correlation test. In the arrangement described above, the correlation test is carried out once, near to the beginning of each sentence, and the detected offset period is carried forward for the rest of that sentence. Of course there are many possible alternatives. For example, the correlation test could be carried out for each newly sung note, or after each group of n newly sung notes (e.g. every three notes or note clock periods), so as to allow the time offset to be modified during the course of the sentence. In this case it is desirable to include a filtering operation to limit variation of the time offset during the sentence. For example, in a simple arrangement, only a certain maximum variation (e.g. ±1 note clock period) could be allowed between successive detections of the time offset during a single sentence.

The correlation test could use features other than pitch. For example, known speech detection logic could be used to detect the lyrics that the user should have sung, with that detection being carried out over a range of ±n note clock periods as described above. Speech detection systems tend not to give an absolute answer as to whether a user said a certain word, but rather give a probability value that the word was said. So, the correlation test could seek the great combined probability over the range of possible offset periods that the user said (sang) the appropriate words for the first few notes. The output of a speech detector could be combined with the pitch detection to give a combined likelihood value of whether the user was singing with each possible value of the delay/advance period.

The maximum allowable time offset could be set in response to a game level (e.g. easy, medium, difficult). At an "easy" game level, a time offset of, say, ±3 note clock periods might be allowed, whereas a at a "difficult" game level, a maximum time offset of, say, ±1 note clock periods might be allowed.

FIG. 4 described the operation of the embodiment as a set of logical blocks, for clarity of the description. Of course, although the blocks could be implemented in hardware, or in semi-programmable hardware (e.g. field programmable gate array(s)), these blocks may conveniently be implemented by parts of the PlayStation2 system shown in FIG. 1 under the control of suitable software. One example of how this may be achieved is as follows:

| | |
|---|---|
| Control logic 800 | Emotion engine 100, accessing: |
| Note clock generator 840 | HDD 390, |
| Pitch detector 850 | ROM 400, |
| Registers 860, 880 | RDRAM 500 etc |
| Comparator 870 | |
| Scoring logic 890 | |
| Replay logic 820 | Emotion engine 100, accessing: |
| | DVD/CD interface 450 |
| | SPU 300 (for audio output) |
| | IOP 700 (for microphone input) |
| | GS 200 (for video output) |

FIG. 6 schematically illustrates an example screen display on the television set 305. The lyrics to be sung 900 appear in a horizontally scrolling row, with a current lyric 910 being highlighted. The detection of the current lyric is made by the note clock stepping though the song elements in the song file, taking into account the number of clock periods specified in respect of each song element.

A schematic representation of the pitch to be sung and the length of each note is given by horizontal bars 920. These are derived from the pitch values (midi-note values) in the song elements in the song file, but on the screen they do not give a precise measure of pitch or note length but are arranged so as to indicate the general trend. So, if the next note is lower than the current note, the bar 920 will appear slightly lower on the screen, though not necessarily in any proportion to the difference in pitch between the two notes.

Dashed lines 930 schematically indicate the user's attempt to sing each note, as detected by the pitch detector. If the user's note is flat, the dashed line is drawn lower on the screen than the line 920 representing the corresponding target note. If the user's note is sharp, the dashed line will be drawn higher than the line 920. Similarly, late or early user notes are shown to the right or left of the corresponding line 920. As before, the positional differences been the lines are schematic rather than in proportion to any pitch or timing difference.

FIG. 7 schematically illustrates a perfectly timed singer. Each target note 940 (shown as notes C, B, C, D, D . . . ) is sung 950 at exactly the right time.

In FIG. 8, the correct sequence of notes, C, B, C, D, D . . . is sung, but they are sung late. In the absence of the measures described above, all but one of the notes would be judged to be wrong—and to be significantly sharp or flat.

FIG. 9, the notes are all sung late, but the timing off-set 960 is applied so that the constant degree of lateness is compensated by the registers 860, 880. The user is given a high score.

In so far as the embodiments of the invention described above are implemented, at least in part, using software-controlled data processing apparatus, it will be appreciated that a computer program providing such software control and a storage medium by which such a computer program is stored are envisaged as aspects of the present invention.

The invention claimed is:

1. Karaoke game processing apparatus comprising:
   a display for indicating successive groups of target notes to be sung by a user, each target note being defined by a pitch and a target time of singing that note, each successive group of target notes having a sequence of target notes; and
   scoring logic for determining a user score in which detected notes sung by the user are compared with the target notes of a given successive group, the scoring logic comprising:
   an input arrangement by which a sequence of notes sung by the user may be detected, the detected sequence of notes including a sequence of pitches sung by the user according to a timing thereof;
   a comparator for comparing the pitches and the timing of the detected sequence of notes sung by the user with the pitches and target times of the sequence of target notes of the given successive group to determine the user score; and
   a detector for detecting a timing offset between the timing of the sequence of pitches of the detected sequence of notes sung by the user and the target times of the sequence of target notes of the given successive group as a relative timing displacement between the timing of the sequence of pitches of the detected sequence of notes sung by the user and the target times of the pitches of the sequence of target notes of the given successive group of target notes;
   wherein the timing offset is detected at a beginning of each successive group of target notes and that timing offset is applied as a time shift to the timing of the detected sequence of notes sung by the user when comparing the pitches and the timing of the detected sequence of notes sung by the user to the pitches and the target times of the target notes to determine the user score, while maintaining a timing of the indication of target times of the target notes by the display for indicating each of the successive groups of target notes for the duration of each successive group of target notes.

2. Apparatus according to claim 1, in which:
   the input arrangement comprises a microphone.

3. Apparatus according to claim 2, in which the scoring logic is operable to detect that a user has successfully sung a note to correspond to a target note if a pitch generated by the user is within a tolerance amount of pitch of the corresponding target note.

4. Apparatus according to claim 3, in which:
   the target notes indicate a required word to be sung, the user being required to sing the required word; and
   the scoring logic is operable to vary the tolerance amount in dependence on the required word.

5. Apparatus according to claim 1, in which the scoring logic is arranged to detect a difference in pitch between the pitch of a target note and the octave-multiple of a note sung by the user which is closest in pitch to the pitch of the target note.

6. Apparatus according to claim 1, in which the groups are separated by pauses in which no user notes are expected to be sung.

7. Apparatus according in claim 6, in which the scoring logic is arranged to detect the timing offset after each pause.

8. Apparatus according to claim 1, in which the comparator is configured to base its comparison on an initial sequence of notes sung by the user.

9. Apparatus according to claim 1, in which the scoring logic is arranged to detect the correlation between the sequence of notes sung by the user and the sequence of target notes at two or more values of the timing offset, and to set the timing offset to be that one of the possible values for which the detected correlation is greatest.

10. Apparatus according to claim 9, in which the scoring logic is operable to set the timing offset to zero if there is less than a predetermined correlation between the sequence of notes sung by the user and the sequence of target notes.

11. Apparatus according to claim 1, in which the target times of the target notes define start times in respect of the associated target notes.

12. Apparatus according to claim 1, in which the target times of the target notes define durations in respect of the associated target notes.

13. A method of karaoke game processing for determining a user score in which notes sung by a user are compared with target notes, the target notes being arranged as successive groups of target notes, each target note being defined by a pitch and a target time of singing that note, the method comprising:
    indicating, by a processing device, the successive groups of target notes to the user, each target note indicated to the user having an associated target time of singing;
    detecting, by the processing device, a sequence of notes sung by the user, including a sequence of pitches sung by the user according to a timing thereof;
    comparing, by the processing device, the pitches and the timing of the detected sequence of notes sung by the user with the pitch and target times of a sequence of target notes to determine the user score;
    detecting, by the processing device, a timing offset between the timing of the sequence of pitches of the detected sequence of notes sung by the user and the target times of a corresponding sequence of target notes as a relative displacement between the timing for the sequence of pitches of the detected sequence of notes sung and the target times of the pitches of the sequence of target notes based on the comparison;
    detecting, by the processing device, the timing offset at a beginning of each successive group of target notes; and
    applying, by the processing device, the timing offset as a time shift to the timing of the detected sequence of notes sung by the user when comparing the pitches and the timing of the detected sequence of notes sung by the user to the pitches and the target times of the target notes to determine the user score, while maintaining the timing of the indication of target notes by the display for indicating the successive groups of target notes, for the duration of each successive group of target notes.

14. A non-transitory tangible computer-readable storage medium on which computer readable instructions of a program are stored, the instructions, when executed by a processor, cause the processor to perform a method of karaoke game processing for determining a user score in which notes sung by a user are compared with target notes, the target notes being arranged as successive groups of target notes, each target note being defined by a pitch a target time of singing that note, the method comprising:

indicating the successive groups of target notes to the user;

detecting a sequence of notes sung by the user including a sequence of pitches sung by the user according to a timing thereof;

comparing the pitches and the timing of the detected sequence of notes sung by the user with the pitches and target times of a sequence of target notes to determine the user score;

detecting a timing offset between the timing of the sequence of pitches of the detected sequence of notes sung by the user and the target times of a corresponding sequence of target notes as a relative displacement between the timing of the detected sequence of notes sung by the user and the target times of the sequence of target notes based on the comparison;

detecting the timing offset at a beginning of each successive group of target notes; and applying the timing offset as a time shift to the actual timing of the notes sung by the user when comparing the pitches and the timing of the detected sequence of notes sung by the user to the pitches and the target times of the target notes to determine the user score, while maintaining the timing of the indication of target notes by the display for indicating the successive groups of target notes, for the duration of each successive group of target notes.

15. Apparatus according to claim 1, in which the scoring logic further includes:

a detector configured to detect a second timing offset during each group of target notes;

the comparator being configured to use the second timing offset to adjust the time shift for each group of target notes, wherein the time shift is adjusted by only a certain maximum adjustment in order to limit variation of the timing offset during each group of target notes.

16. The method according to claim 13, further comprising:

detecting a second timing offset during each group of target notes; and using the second timing offset to adjust the time shift for each group of target notes, wherein the time shift is adjusted by only a certain maximum adjustment in order to limit variation of the timing offset during each group of target notes.

17. The recording medium according to claim 14, in which the method further includes:

detecting a second timing offset during each group of target notes; and using the second timing offset to adjust the time shift for each group of target notes, wherein the time shift is adjusted by only a certain maximum adjustment in order to limit variation of the timing offset during each group of target notes.

18. Apparatus according to claim 1, wherein:

after comparing the detected sequence of notes sung by the user with a sequence of target notes, the scoring logic identifies a closest match between a pitch of the detected notes sung by the user and a pitch of the target notes, and when the closest match is not within a threshold pitch difference value, the scoring logic sets the timing offset to zero.

19. Apparatus according to claim 1, wherein the scoring logic further applies, when all of the notes are sung late, so that a constant degree of lateness is compensated when determining the user score.

* * * * *